United States Patent
Zimmer et al.

(10) Patent No.: US 6,455,613 B1
(45) Date of Patent: Sep. 24, 2002

(54) TIRE WITH COMPONENT OF RUBBER COMPOSITION WHICH CONTAINS MODIFIED FUMED SILICA REINFORCEMENT

(75) Inventors: Rene Jean Zimmer, Howald; Marc Weydert, Luxembourg, both of (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 35 days.

(21) Appl. No.: 09/642,294

(22) Filed: Aug. 18, 2000

(51) Int. Cl.$^7$ ................................. C08K 9/06
(52) U.S. Cl. ..................................... 523/213
(58) Field of Search ........................... 523/213

(56) References Cited

U.S. PATENT DOCUMENTS

| | | | | |
|---|---|---|---|---|
| 5,472,493 A | * | 12/1995 | Regan | 106/491 |
| 5,679,728 A | | 10/1997 | Kawazura et al. | 523/215 |
| 5,985,953 A | * | 11/1999 | Lightsey | 523/212 |
| 6,160,047 A | * | 12/2000 | Agostini | 524/494 |

OTHER PUBLICATIONS

*Encyclopedia of Chemical Technology*, Third Edition, vol. 20, by Kirk–Othmer. p. 768. Publication date 1982.

* cited by examiner

*Primary Examiner*—Paul R. Michl
(74) *Attorney, Agent, or Firm*—Henry C. Young, Jr.

(57) ABSTRACT

The invention relates to a tire having a least one component comprised of a rubber composition which contains aggregates of fumed silica reinforcement. Such tire component may be a tire tread.

18 Claims, No Drawings

TIRE WITH COMPONENT OF RUBBER COMPOSITION WHICH CONTAINS MODIFIED FUMED SILICA REINFORCEMENT

FIELD OF THE INVENTION

The invention relates to a tire having a least one component comprised of a rubber composition which contains aggregates of fumed silica reinforcement. Such tire component may be a tire tread.

BACKGROUND OF THE INVENTION

Tires are conventionally prepared with components of various rubber compositions which contain particulate reinforcement in form of carbon black and/or amorphous silica.

While the amorphous silica reinforcement for such tire component rubber compositions are conventionally in a form of precipitated silica, it is to be appreciated that silica such as pyrogenic, or fumed, silica has sometimes also been suggested for such purpose.

As reported in the *Handbook of Fillers for Plastics* by H. S. Katz, et al (1987), published by Van Nostrand Reinhold Company, Pages 174 through 177, fumed silicas are fluffy white powders of an amorphous structure which may be produced, for example, by hydrolysis of silicon tetrachloride in a flame of hydrogen and oxygen at a temperature of, for example, about 1100° C. or 1800° C. in which molten spheres of fumed silica are formed (primary particles) which collide and fuse with one another to form three-dimensional, somewhat branched, chain-like particles (secondary particles) which may be referred to as aggregates.

Fumed silicas can be modified according to the above publication by reaction with silanol groups or by altering the flame process. Commercially available fumed silicas, according to the publication, may be divided into three groups, namely hydrophilic fumed silicas, hydrophobic fumed silicas and mixed oxide fumed silicas. The exemplary hydrophobic silica is created by reacting a hydrophilic silica with an organosilane such as, for example, dimethylchlorosilane.

Fumed silicas typically have smaller bulk densities (uncompacted) than precipitated silicas. For example, fumed silicas reported in the above publication in 1987 had associated bulk densities (uncompacted) ranging, for example, from 37 to 130 g/l. For example, representative Aerosol fumed silicas from Degussa in are reported as having bulk densities ranging from 50 or 130 g/l. Representative Cab-O-Sil fumed silicas from Cabot are reported as having bulk densities of 37 and 72 g/l. Representative HDK fumed silicas from Wacker are reported as having a bulk density of 60 g/l.

In the *Encyclopedia of Chemical Technology Third Edition*, Vol. 20 (1982) by Kirk-Othmer, Page 768, it is reported that a bulk density of pyrogenic silica may range from 30 to 1200 g/l and that a bulk density of precipitated silica may range from 30 to 3000 g/l.

In the description of the invention, the term "phr" relates to parts by weight of a particular ingredient per 100 parts by weight of rubber contained in a rubber composition.

The terms "rubber" and "elastomer" are used interchangeably unless otherwise indicated, and the terms "cure" and "vulcanize" may be used interchangeably unless otherwise indicated.

SUMMARY OF THE INVENTION

The invention relates to a tire having at least one component comprised of a rubber composition which contains aggregates of fumed silica reinforcement.

In accordance with this invention, a tire is provided having at least one component of a rubber composition comprised of, based upon 100 parts by weight of elastomer (phr), A. 100 phr of at least one diene hydrocarbon based elastomer, B. about 35 to about 100 phr of particulate reinforcement comprised of about 35 to about 100, alternately about 35 to 90, phr of a branched, fumed amorphous silica and from zero to about 65, alternately about 10 to about 65, phr of at least one additional particulate reinforcement selected from of carbon black, synthetic amorphous silica and silica treated carbon black, wherein said fumed silica aggregates contain hydroxyl groups (e.g. silanol groups) on their surface; wherein prior to mixing with said elastomer(s), said fumed silica aggregates have a pour density in a range of from about 40 to about 60 g/l and a specific density in a range of from about 3.8 to about 5 g/cm$^3$; and wherein said filmed silica aggregates are (1) blended with said elastomer(s) together with a silica coupler having a moiety reactive with said hydroxyl groups on the surface of said fumed silica and another moiety interactive with at least one of said diene-based elastomers, preferably an organosulfur silane of the general formula (I)

$$[X_m(R^2O)_{3-m}Si\text{—}R^3]_2S_z \quad (I)$$

wherein X is a halogen radical, preferably a chlorine radical, $R^2$ is an alkyl radical having from 1 to 3 carbon atoms, preferably selected from methyl and ethyl groups; $R^3$ is an alkylene radical having from 1 to 18 carbon atoms, preferably from 2 through 4 carbon atoms; m is zero or an integer of from 1 through 3, preferably zero or an integer of 1 or 2; and z is an integer of from 2 to 8, preferably an average of 2 to about 2.6 or from about 3.5 to about 4, or (2) pre-treated with an alkylsilane of the general formula (II) and thereafter blended with said elastomer(s) and said silica coupler:

$$X_n\text{—}Si\text{—}R_{4-n} \quad (II)$$

wherein R is an alkyl radical having from 1 to 18 carbon atoms, preferably from 1 through 4 carbon atoms; n is an integer of from 1 through 3; X is a radical selected from the group consisting of halogens, preferably chlorine, and alkoxy radicals having from 1 through 3 carbon atoms, preferably selected from methyloxy and ethyl radicals; or (3) pre-treated with at least one material prior to blending with said elastomer(s) selected from at least one of a. hexamethyldisilazane;
b. an organosulfur silane of said general formula (I);
c. an organosulfur silane of the general formula (III)

$$(X)m(R^2O)_{3-m}Si\text{—}R^3\text{—}SH \quad (III)$$

wherein X is a halogen radical, preferably a chlorine radical; $R^2$ is an alkyl radical having from 1 to 18 carbon atoms, preferably selected from methyl and ethyl groups; $R^3$ is an alkylene radical having from 1 to 18 carbon atoms, preferably from 2 through 4 carbon atoms; m is zero or an integer of from 1 through 3, preferably zero or an integer of 1 or 2; and z is an integer of from 2 to 8, preferably an average of 2 to about 2.6 or from about 3.5 to about 4; and optionally in addition to the above materials.

d. an alkylsilane selected from said general formula (II).

In one aspect of the invention, said fumed silica is pre-treated with a combination of:

A. a material of the general formula (I) and of the general formula (II), and

B. a material of the general formula (II) and of the general formula (III),

In the practice of this invention, where said fumed silica is pre-treated with at least one material of the general formula (I) or (III), preferably said pre-treated fumed silica is blended with said elastomer(s) in the absence of said silica coupler unless an amorphous precipitated silica, silica treated carbon black or fumed silica which has not been so pre-treated is added to said elastomer(s) and where it is desired to blend a silica coupler with said elastomer on behalf of said un-pretreated silica materials.

A significant consideration of use of the specified branched fumed silica for reinforcement of a rubber tire component is its inherent substantial absence of water (about 0.1 to about 1.5 weight percent water), prior to mixing with the elastomer(s) as compared to a conventional synthetic amorphous precipitated silica (containing about 3.5 to about 8 percent water). This is considered herein to be significant because the relative lack of coordinated water on the surface of silica makes the silica surface more accessible to surface treatment, including said pre-treatment specified by this invention.

The fumed silica contemplated for use in tire components for the present invention is characterized by a relatively visibly branched, less than spherical, structure as opposed to fumed silica which has a relatively visibly more spherically oriented, although still somewhat branched structure. Apparently as a result of the more visibly branched structure, the fumed silica for the tire components of the present invention exhibits relatively different pour densities and specific densities than such other fumed silica.

The branched fumed silica for the tire components of this invention has a pour density (ASTM D1513), which may also be referred to as its apparent density, ranging from 40 to 60 g/l prior to mixing with the elastomer(s). This is intended to be differentiated from fumed silicas having a pour density ranging from 50 to 160 g/l. By comparison, precipitated silicas (not a fumed silica) typically have a pour densities ranging from about 280 to about 350 g/l. There are therefore clear and considerable differences in the respective apparent, or pour, densities.

The branched fumed silica for use in the tire components for this invention also has a specific density (ASTM D2638) in a range of from 3.8 to 5 g/cm$^3$, prior to mixing with the elastomer(s), in contrast to fumed silicas having a specific density in a range of about 2.7 to 3.5 g/cm$^3$. By comparison, precipitated silicas typically have a specific density in a range of from 2.1 to 2.4 g/cm$^3$. There are therefore clear and considerable differences in the respective specific densities.

A significant aspect of the invention is that the fumed silica aggregates for this invention are required to be characterized by both the pour (or apparent) density and the specific density characteristics prior to their blending with the elastomer(s) rather than to be characterized by a pour density or a specific density alone. It is considered that the very considerable differences between the pour density and the specific density of the required fumed silica aggregates is an indication of a considerable degree of branching thereof. Accordingly, it is considered herein that the required fumed silica aggregates for use in this invention are necessarily required to be characterized by both the pour and specific densities The branched fumed silica aggregates for the tire components of this invention are generally of an elongated, branched form comprised of a primary trunk composed of fused primary silica particles having an average length to diameter (L/D) in a range of about 1.1/1 to about 4/1 and having a multiplicity of branches composed of primary fused silica particles with an average length to diameter (L/D) in a range of about 1.1/1 to about 4/1.

As a result of the structure of such fumed silica aggregates, such fumed silica aggregate may be preferentially oriented in the rubber composition for a tire component and therefore present unique reinforced tire components. For example, it is contemplated that from about 20 to about 80 percent of such fumed silica aggregates may be oriented in substantially the same direction in the rubber composition of the tire component, to thereby result in anisotropic rubber reinforcement. Such orientation may be achieved by processing the fumed silica reinforced rubber component prior to assembly of the tire, such as by extrusion or directional milling.

In one aspect of the invention, it is preferred that the branched aggregate of fumed silica particles for this invention is characterized by having a BET-SSA surface area in a range of about 100 to about 400, preferably about 150 to about 350, m$^2$/g; and a CTAB surface area in a range of about 100 to about 400, preferably about 140 to about 350 m$^2$/g, wherein the ratio of said BET and CTAB surface areas is in a range of about 0.9 to about 1.2.

The CTAB surface area is the external surface area as evaluated by cetyl trimethylammonium bromide with a pH of 9. The method is described in ASTM D 3849-80 for set-up and evaluation. The CTAB surface area is a well known characterization of silica.

The BET surface values may be obtained, for example, by using the method described in Brenner, Emmett, Teller *Journal of the American Chemical Society*, Volume 60, Page 309 (1938). Set-up conditions may be suitably described as using a 500 mg of sample; first degassing 2 hours at 105° C., ambient pressure; and a second degassing for 1 hour at 150° C. at 10 to 3 mm Hg. The BET surface area is a well known characterization of particles and aggregates of various materials including silicas.

A branched fumed silica which may be used for reinforcement of the tire component of this present invention is commercially available from Wacker Chemie GmbH under the designations S13, V15, N20, T30, T40, H15, H20, H30, H2000, H2000/4, H3004, H2015EP and H2050EP. The silicas under the designations S13, V15, N20, T30 and T40 are considered herein as "untreated" and fall within the above described density ranges. The silica under the described designations HI5, H20, H30, H2000, H2000/4, H30004, H20/SEP and H20S0EP are considered herein as being "treated" with surface modifiers. For example, H20 is understood to be the N20 fumed silica further modified with dichlorodimethylsilane. The H2000 silica is understood to be the N20 fumed silica further modified with hexamethyldisilazane.

Various representative properties of the above untreated and treated fumed silicas have been heretofore reported by Wacker Chemie and are reported herein in the following Table 1.

TABLE 1A

| Property | Silica | | | | |
| --- | --- | --- | --- | --- | --- |
| | S13 | V15 | N20 | T30 | T40 |
| Surface Area (BET)[1] | 125 | 150 | 200 | 300 | 400 |
| Apparent Density[2] | 50 | 50 | 40 | 40 | 40 |

TABLE 1A-continued

| | Silica | | | | |
|---|---|---|---|---|---|
| Property | S13 | V15 | N20 | T30 | T40 |
| Apparent Density of Compressed Grades[3] | 0 | 110 | 110 | 110 | 0 |

TABLE 1B

| | Silica | | | | | | | |
|---|---|---|---|---|---|---|---|---|
| Property | H15 | H20 | H30 | H2000 | 2000/4 | H3004 | H2015EP | H2050EP |
| Surface Area (BET)[1] | 120 | 170 | 250 | 140 | 120 | 200 | 100 | 100 |
| Apparent Density[2] | 40 | 40 | 40 | 220 | 230 | 80 | 200 | 200 |

[1]DIN 66 131 (m²/g); nominally ± (10% to 18%)
[2]DIN 150 787/11 (g/l)
[3]DIN 150 787/11 (g/l)

The branched fumed silica, as hereinbefore discussed, may be pretreated with an alkylsilane of the general formula (II)

$$X_n\text{—}Si\text{—}R_{4-n} \quad (II)$$

wherein R is an alkyl radical having from 1 to 18 carbon atoms, n is an integer of from 1 to 3, and X is a radical selected from the group consisting of halogens and alkoxy radicals having from 1 to 3 carbon atoms. Preferably, R is 1 to 2 carbon atoms, n is 2 and X is chlorine.

Representative alkylsilanes, or organoalkylsilanes of formula (II) are, for example, trichloromethylsilane, dichlorodimethylsilane, chlorotrimethylsilane, trimethoxymethylsilane, dimethoxydimethylsilane, methoxytrimethylsilane, trimethoxypropylsilane, trimethoxyoctylsilane, trimethoxyhexadecylsilane, dimethoxydipropylsilane, triethoxymethylsilane and diethoxydimethylsilane. Preferable organosilanes are dichlorodimethylsilane, chlorotrimethylsilane and hexamethyldisilazane The fumed silica, as hereinbefore discussed, may also be treated with an organosulfur silane of the formula (I) or (III)

$$(X)_m(R^2O)_{3-m}Si\text{—}R^3\text{—}SH \quad (II)$$

$$[X_m(R^2O)_{3-m}Si\text{—}R^3]_2S_z \quad (I)$$

Representative of organosulffirsilanes of formula (III) are organomercaptosilanes as, for example, mercaptomethyltrimethoxysilane, mercaptoethyltrimethoxysilane, mercaptopropyltrimethoxysilane, mercaptomethyltriethoxysilane, mercaptoethyltripropoxysilane and mercaptopropyltriethoxysilane. Preferable organomercaptosilanes of formula (III) are mercaptopropyltriethoxysilane and mercaptopropyltrimethoxysilane.

Representative of organosulfursilanes of formula (I) are, for example, bis (3-alkoxysilylalkyl) polysulfides having from 2 to about 6, with an average of 2 to 2.6 or from 3.5 to 4 connecting sulfur atoms in its polysulfidic bridge. For example, such materials might be selected from at least one of a bis-(3-triethoxysilylpropyl) disulfide material with an average of from 2 to 2.6 connecting sulfur atoms in its polysulfidic bridge, and a bis(3-triethoxysilylpropyl) tetrasulfide material with an average of from 3.5 to 4 connecting sulfur atoms in its polysulfidic bridge.

In one aspect of the invention, as hereinbefore discussed, the branched fumed silica may be treated with both a hydrophobating agent represented by formula (II) and a coupling agent represented by at least one of formulas (I) and (III).

In the practice of this invention, the tire of this invention has at least one component of the branched fumed silica reinforced rubber composition such as, for example a tire tread, tread base, sidewall, insert, wirecoat, apex, chafer and innerliner. Preferably, the tire component is a tire tread.

In practice of the invention, various diene-based elastomers may be used for the branched fumed silica reinforced tire component.

Such elastomers may be, for example, homopolymers and copolymers of conjugated dienes such as for example isoprene and 1,3-butadiene and copolymers of such dienes with a vinyl aromatic compound such as styrene or alphamethyl styrene, preferably styrene.

Representative of such elastomers are, for example, cis 1,4-polyisoprene rubber (natural and synthetic), cis 1,4-polybutadiene rubber, styrene/butadiene copolymer rubber (prepared by aqueous emulsion of organic solvent polymerization), styrene/isoprene/butadiene terpolymer rubber, butadiene/acrylonitrile rubber, 3,4-polyisoprene rubber and isoprene/butadiene copolymer rubber.

Various commercially available synthetic, amorphous precipitated silicas may also be used together with the branched fumed aggregates for the reinforcement of the diene based elastomers. Such precipitated silicas are typically characterized by the aforesaid BET and CTAB surface areas. Representative of such silicas, for example, only and without limitation, are silicas from PPG Industries under the Hi-Sil trademark with designations 210, 243, etc; silicas from Rhodia, with designations of Zeosil 1165MP and Zeosil 165GR, silicas from Degussa AG with designations VN2 and VN3, and silicas from AKZO Chemie, etc.

It is readily understood by those having skill in the art that the rubber composition of the tire component for this invention would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The presence and relative amounts of the above additives are not considered to be an aspect of the present invention which is more primarily directed to the utilization of the aforesaid specified branched, fumed silicas for the reinforcement of rubber tire components.

The tires can be built, shaped, molded and cured by various methods which will be readily apparent to those having skill in such art.

While certain representative embodiments and details have been shown for the purpose of illustrating the invention, it will be apparent to those skilled in this art that various changes and modifications may be made therein without departing from the spirit or scope of the invention.

What is claimed is:

1. A tire having at least one component of a rubber composition comprised of, based upon 100 parts by weight of elastomer (phr), A. 100 phr of at least one diene hydrocarbon based elastomer;
   B. about 35 to about 100 phr of particulate reinforcement comprised of about 35 to about 90 phr of a pre-treated branched, fumed amorphous silica and from about 10 to about 65 phr of at least one additional particulate reinforcement selected from carbon black, synthetic amorphous precipitated silica and silica treated carbon black, wherein said fumed silica aggregates prior to pre-treatment contain hydroxyl groups on their surface; and wherein said pre-treated branched fumed silica aggregates are prepared by (1) pre-treatment with an alkylsilane hydrophobating agent of the general formula (II) and thereafter blended with said elastomer(s) and a silica coupling agent of the general formula (I) namely:

wherein X is chlorine; $R^2$ is selected from methyl and ethyl groups; $R^3$ is an alkylene radical having from 2 through 4 carbon atoms; m is zero or an integer of 1 or 2; and z is an integer of from 2 to 8 with an average of from 2 to about 2.6 or from about 3.5 to about 4, and

wherein R is an alkyl radical having from 1 through 4 carbon atoms; n is an integer of from 1 through 3; X is a radical selected from the group consisting of chlorine, and alkoxy radicals selected from methyl and ethyl radicals; or (2) pretreatment with at least one material prior to blending with said elastomer(s) selected from at least one of, or mixtures thereof, of
   a. hexamethyldisilazane; or
   b. an organosulfur silane of said general formula (I), or
   c. an organosulfur silane of the general formula (III)

wherein X is a chlorine radical; $R^2$ is selected from methyl and ethyl radicals; $R^3$ is an alkylene radical having from 2 through 4 carbon atoms; m is zero or an integer of 1 or 2, and z is an integer of from 2 to 8 with an average of from 2 to about 2.6 or from about 3.5 to about 4; and optionally in addition to the above materials, and optionally
   d. an alkylsilane hydrophobating agent selected from said general formula (II);
   wherein, said branched fumed silica aggregates are comprised of a primary trunk composed of fused primary silica particles having an average length to diameter (L/D) in a range of about 1.1/1 to about 4/1 and having a multiplicity of branches composed of primary fused silica particles with an average length to diameter (L/D) in a range of about 1.1/1 to about 4/1.

2. The tire of claim 1 wherein said branched fumed silica is pre-treated with:
   A. a combination of a material of the general formula (I) and a material of the general formula (II), or
   B. a combination of a material of the general formula (II) and a material of the general formula (III).

3. The tire of claim 1 wherein said branched fumed silica aggregates, prior to mixing with said elastomer(s), contain about 0.1 to about 1.5 weight percent water.

4. The tire of claim 1 wherein said pre-treated branched fumed silica aggregates are blended with said elastomer(s) together with a silica coupling agent having a moiety reactive with said hydroxyl groups on the surface of said fumed silica and another moiety interactive with at least one of said diene-based elastomers.

5. The tire of claim 1 wherein said branched fumed silica aggregates are pre-treated with an alkylsilane of the general formula (II) and are thereafter blended with said elastomer(s) and together with a silica coupling agent having a moiety reactive with said hydroxyl groups on the surface of said fumed silica and another moiety interactive with at least on of said diene-based elastomers, wherein said alkylsilane of formula (II) is selected from at least one of trichloromethylsilane, dichlorodimethylsilane, chlorotrimethylsilane, trimethoxymethylsilane, dimethoxydimethylsilane, methoxytrimethylsilane, trimethoxypropylsilane, trimethoxyoctylsilane, trimethoxyhexadecylsilane, dimethoxydipropylsilane, triethoxymethylsilane and diethoxydimethylsilane.

6. The tire of claim 1 wherein said branched fumed silica aggregates are pre-treated with hexamethyldisilazane and thereafter blended with said elastomer(s) and silica coupling agent.

7. The tire of claim 1 wherein said branched fumed silica aggregates are pre-treated with an organosulfur silane of the general formula (III) and thereafter blended with said elastomer(s) and silica coupling agent, wherein said organosulfur silanes are selected from at least one of mercaptomethyltrimethoxysilane, mercaptoethyltrimethoxysilane, mercaptopropyltrimethoxysilane, mercaptomethyltriethoxysilane, mercaptoethyltripropoxysilane and mercaptopropyltriethoxysilane.

8. The tire of claim 1 wherein said branched fumed silica aggregates are pre-treated with an organosulfur silane of the general formula (III) and thereafter blended with said elastomer(s) and silica coupling agent, wherein said organosulfur silanes are selected from at least one of a bis-(3-triethoxysilylpropyl) polysulfide material with an average of from 2 to 2.6 connecting sulfur atoms in its polysulfidic bridge, and a bis(3-triethoxysilylpropyl) polysulfide material with an average of from 3.5 to 4 connecting sulfur atoms in its polysulfidic bridge.

9. The tire of claim 1 wherein about 20 to about 80 percent of said branched fumed silica aggregates are oriented in substantially the same direction within the rubber composition.

10. The tire of claim 1 wherein said branched fumed silica aggregates have a BET-SSA surface area in a range of about 100 to about 400 $m^2/g$; and a CTAB surface area in a range of about 100 to about 400 $m^2/g$; wherein the ratio of said BET and CTAB surface areas is in a range of about 0.9 to about 1.2.

11. The tire of claim 1 wherein the said elastomer is selected from one at least one of cis 1,4-polyisoprene rubber, natural and synthetic, cis 1,4-polybutadiene rubber, styrene/butadiene copolymer rubber, butadiene/isobutylene copolymer rubber, EPDM rubber, styrene/isoprene/butadiene terpolymer rubber, butadiene/acrylonitrile rubber, 3,4-polyisoprene rubber and isoprene/butadiene copolymer rubber.

12. The tire of claim 1, wherein said silica coupling agent is a bis-(3-alkoxysilylalkyl) polysulfide having from 2 to 8 sulfur atoms, with an average of from 2 to 2.6 or from 3.5 to 4, sulfur atoms in its polysulfidic bridge.

13. The tire of claim 1 wherein said additional reinforcement is both carbon black and precipitated silica.

14. The tire of claim 1 wherein said additional reinforcement is both carbon black and silica treated carbon black, wherein said silica treated carbon black is treated by co-forming carbon black and silica and/or treating carbon black with an alkyl silane.

15. The tire of claim 1 wherein said tire component is a tire tread.

16. The tire of claim 2 wherein said tire component is a tire tread designed to be ground contacting.

17. The tire of claim 6 wherein said tire component is a tire tread designed to be ground contacting.

18. The tire of claim 8 wherein said tire component is a tire tread.

* * * * *